United States Patent
Matsumoto et al.

(10) Patent No.: US 8,274,757 B2
(45) Date of Patent: Sep. 25, 2012

(54) RECORDING HEAD AND DISK DRIVE WITH THE SAME

(75) Inventors: Takuya Matsumoto, Ome (JP); Tomoko Taguchi, Kunitachi (JP); Masaya Ohtake, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/224,858

(22) Filed: Sep. 2, 2011

(65) Prior Publication Data

US 2012/0182644 A1 Jul. 19, 2012

(30) Foreign Application Priority Data

Jan. 18, 2011 (JP) ................................. 2011-008194

(51) Int. Cl.
*G11B 5/31* (2006.01)
(52) U.S. Cl. .................................................. 360/123.11
(58) Field of Classification Search .............. 360/123.11
See application file for complete search history.

(56) References Cited

U.S. PATENT DOCUMENTS

| 5,027,246 A * | 6/1991 | Numazawa et al. ..... 360/125.02 |
| 6,717,770 B1 * | 4/2004 | Crawford ................. 360/123.11 |
| 2010/0134922 A1 * | 6/2010 | Yamada et al. .......... 360/123.01 |
| 2010/0157462 A1 * | 6/2010 | Koizumi et al. ................ 360/71 |
| 2010/0214693 A1 * | 8/2010 | Contreras et al. ........ 360/125.03 |
| 2011/0170216 A1 * | 7/2011 | Sasaki et al. ............. 360/123.11 |

FOREIGN PATENT DOCUMENTS

| JP | 2001-250204 | 9/2001 |
| JP | 2004-030838 | 1/2004 |
| JP | 2004-342164 | 12/2004 |
| JP | 2007-328898 | 12/2007 |
| JP | 2008-171503 | 7/2008 |
| JP | 2009-048719 | 3/2009 |
| JP | 2009-199712 | 9/2009 |
| JP | 2010-157303 | 7/2010 |

OTHER PUBLICATIONS

Japanese Office Action dated Jun. 12, 2012, filed in Japanese counterpart Application No. 2011-008194, 7 pages (with English translation).

* cited by examiner

*Primary Examiner* — Mark Blouin
(74) *Attorney, Agent, or Firm* — Patterson & Sheridan, LLP

(57) ABSTRACT

According to one embodiment, a recording head includes a main pole, a trailing core, a first coil wound around the trailing core, a leading core, and a second coil wound around the leading core. The trailing core includes a return pole opposed to a trailing side of the main pole with a write gap therebetween, and side shields arranged individually on opposite sides of the main pole transversely relative to tracks and magnetically separated from the main pole at a distance not more than double a track pitch of the recording medium. The leading core includes a junction opposed to a leading side of the main pole with a gap therebetween and joined to the side shields with a width of 20 μm or less transversely relative to the tracks and a connecting portion joined to the main pole in a position off the recording medium.

13 Claims, 11 Drawing Sheets

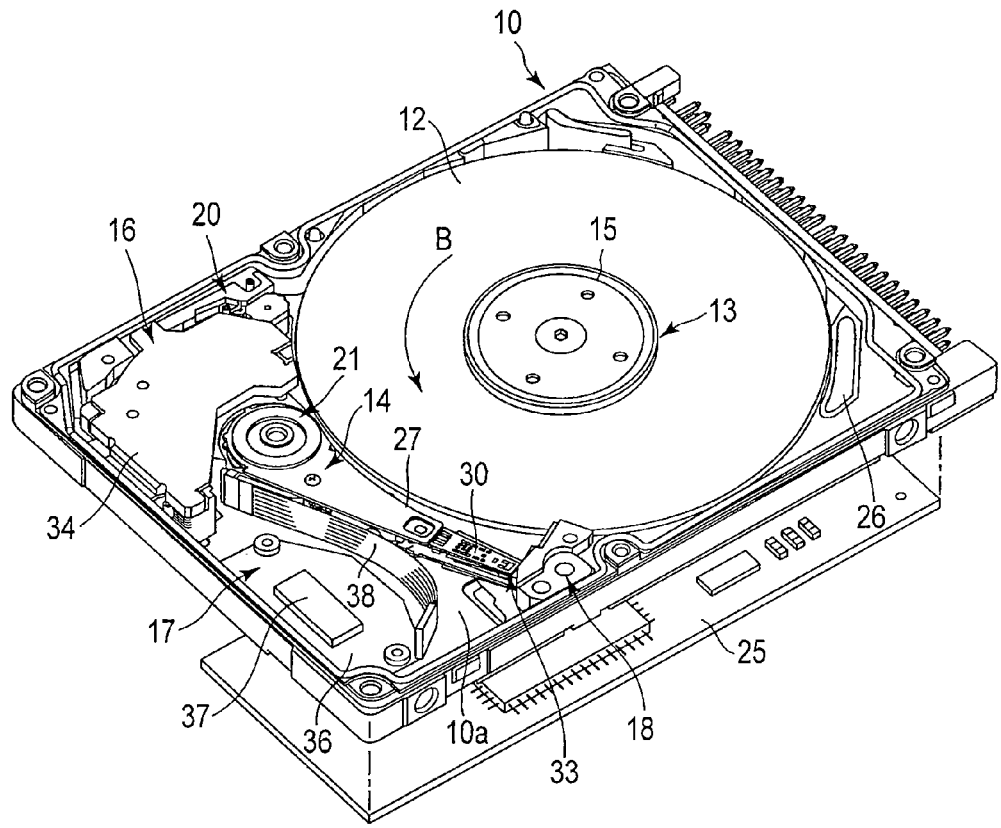
F I G. 1
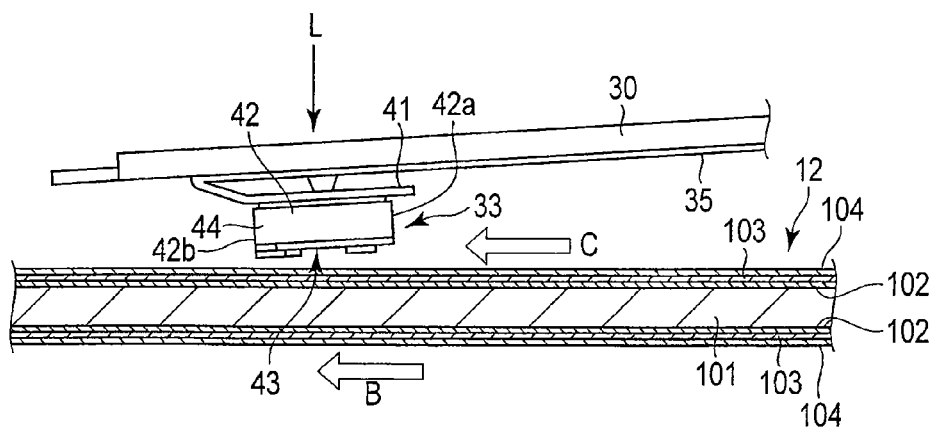
F I G. 2

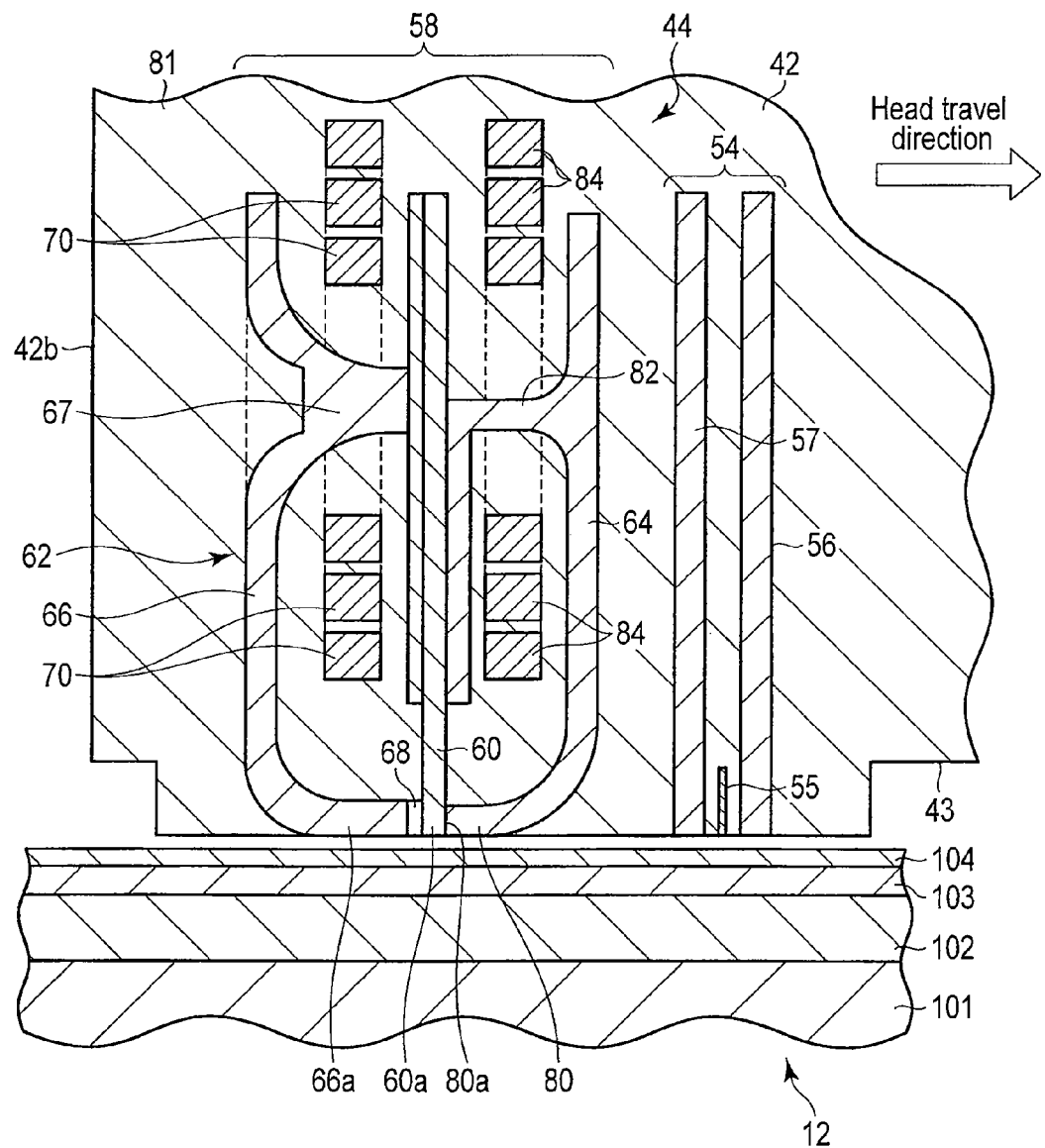
F I G. 3

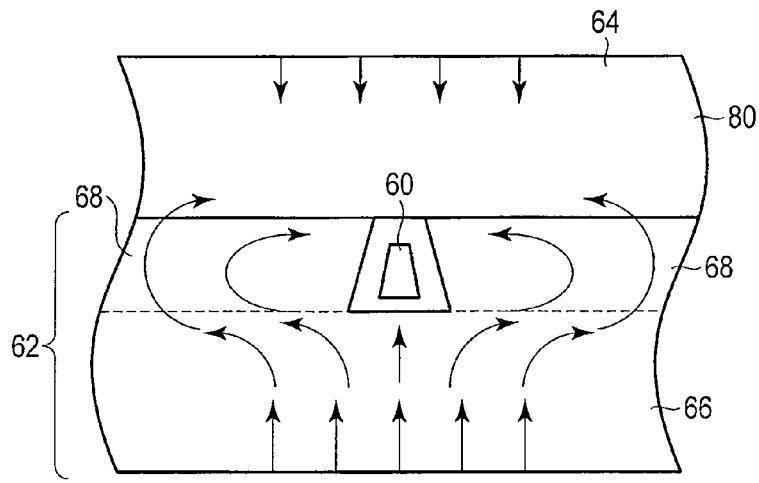
F I G. 9
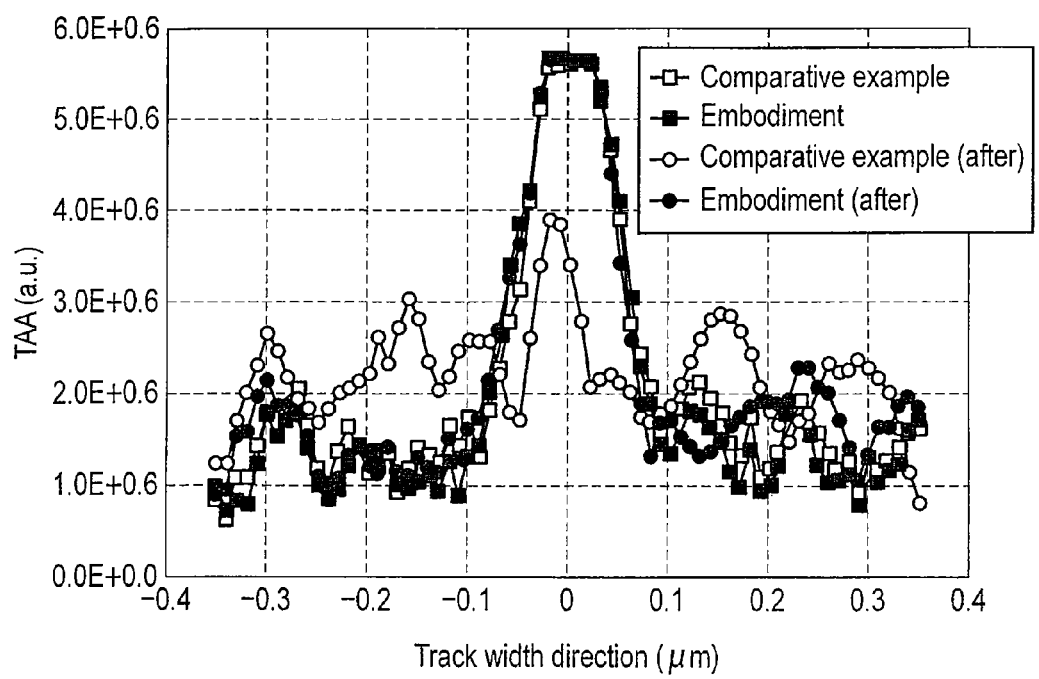
F I G. 10

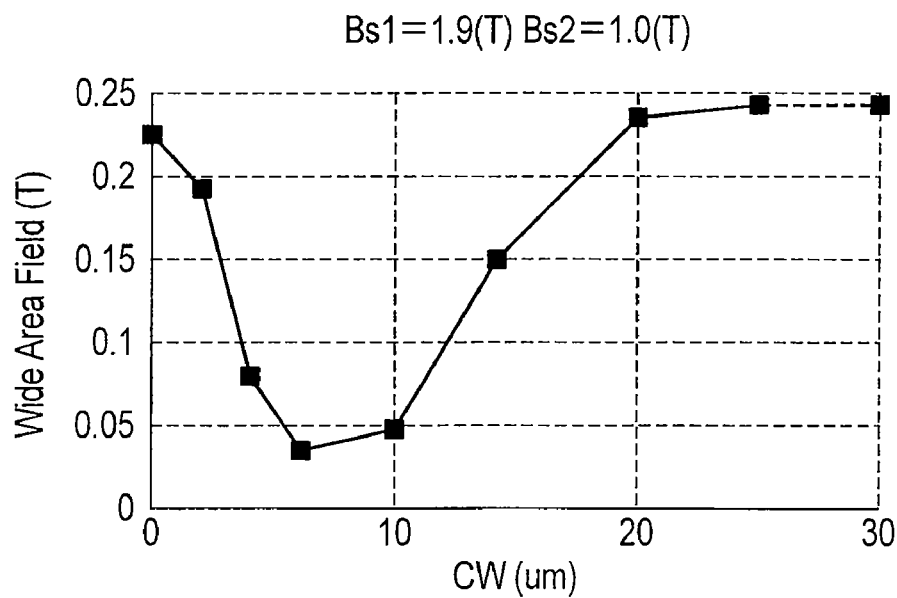
F I G. 12
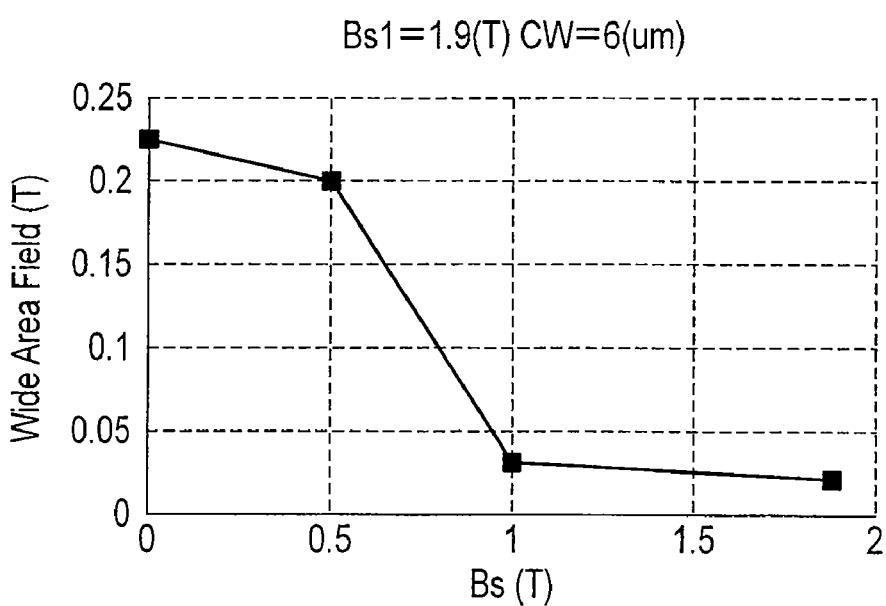
F I G. 13

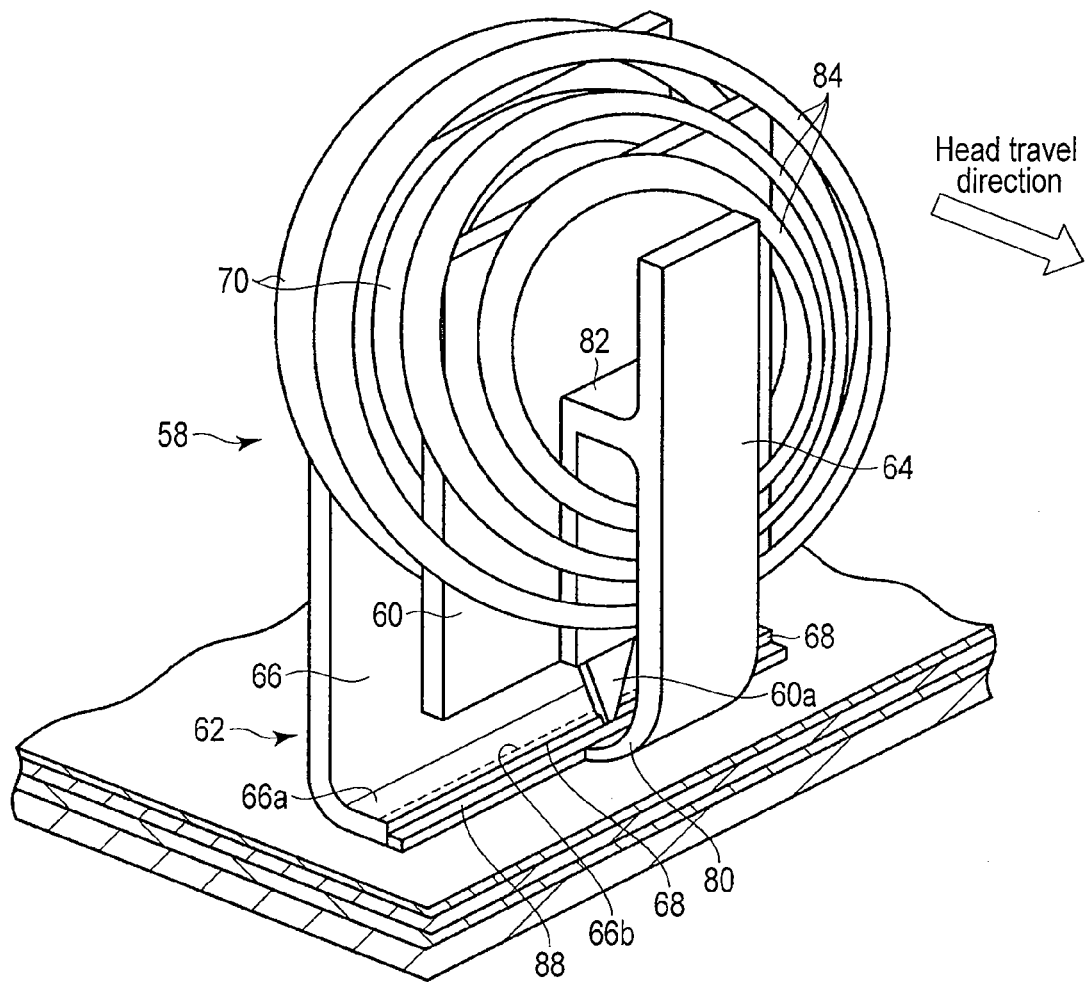
F I G. 15

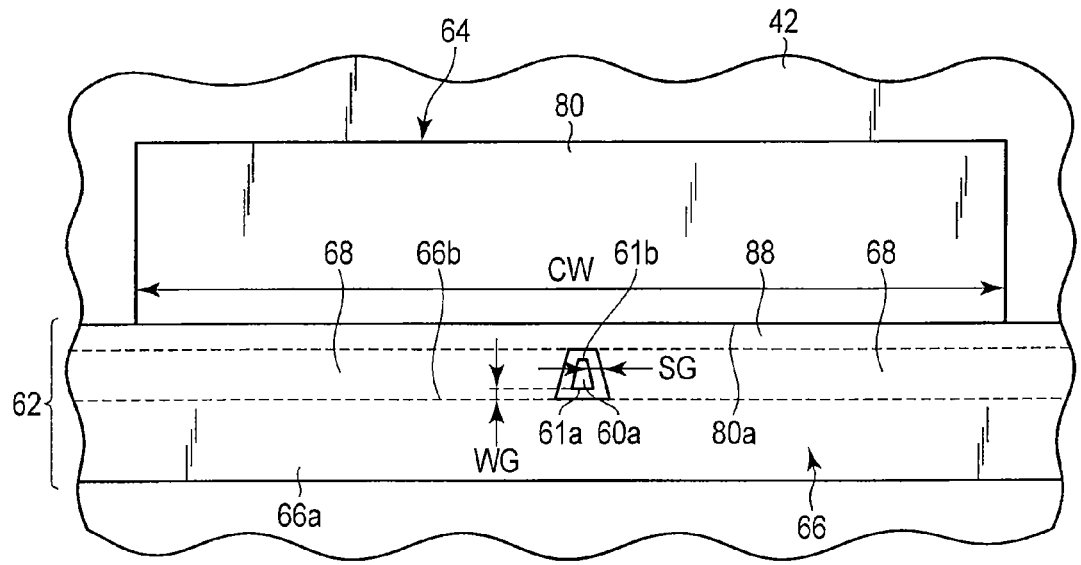
F I G. 16
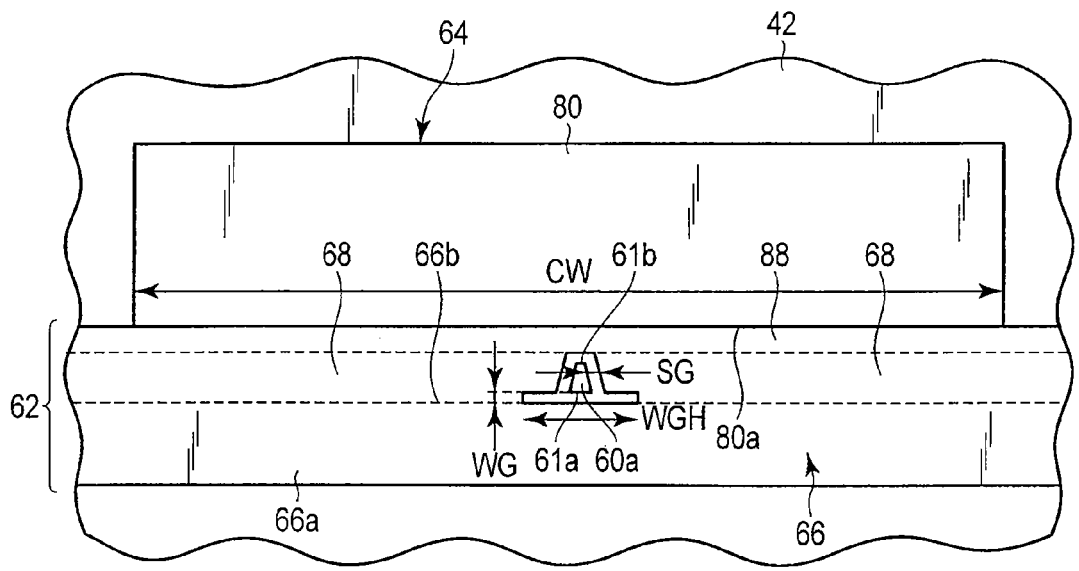
F I G. 17

US 8,274,757 B2

RECORDING HEAD AND DISK DRIVE WITH THE SAME

CROSS-REFERENCE TO RELATED APPLICATIONS

This application is based upon and claims the benefit of priority from Japanese Patent Application No. 2011-008194, filed Jan. 18, 2011; the entire contents of which are incorporated herein by reference.

FIELD

Embodiments described herein relate generally to a recording head for perpendicular magnetic recording used in a disk drive and the disk drive provided with the recording head.

BACKGROUND

A disk drive, such as a magnetic disk drive, comprises a magnetic disk, spindle motor, magnetic head, and carriage assembly. The magnetic disk is disposed in a case. The spindle motor supports and rotates the disk. The magnetic head reads data from and writes data to the disk. The carriage assembly supports the head for movement relative to the disk. The carriage assembly comprises a pivotably supported arm and a suspension extending from the arm, and the magnetic head is supported on an extended end of the suspension. The head comprises a slider mounted on the suspension and a head section disposed on the slider. The head section comprises a recording element for writing and a reproduction element for reading.

Magnetic heads for perpendicular magnetic recording have recently been proposed in order to increase the recording density and capacity of a magnetic disk drive or reduce its size. In one such magnetic head, a recording head comprises a main pole configured to produce a perpendicular magnetic field, return or write/shield pole, and coil. The return pole is located on the trailing side of the main pole with a write gap therebetween and configured to close a magnetic path that leads to a magnetic disk. The coil serves to pass magnetic flux through the main pole.

As a recording pattern is recorded along tracks of the magnetic disk, recording magnetic fields leak from the opposite sides of the main pole transversely relative to the tracks. To reduce the leakage magnetic fields, a recording head is proposed in which side shields are arranged individually on the opposite sides of the main pole transversely relative to the tracks.

In the magnetic head comprising the side shields described above, erase width control is expected of the side shields. In repeating recording operation on the same track, however, recorded data may be erased or degraded in wide regions covering tens of tracks by a return magnetic field just below the side shields, in a distribution of magnetic flux that returns from the main pole to the return pole through a soft magnetic layer below a recording layer of a perpendicular recording medium.

If the side shields are spaced wide apart from the side surface of the main pole, moreover, such a phenomenon may occur that data recorded on adjacent tracks is erased or degraded by magnetic flux (or a fringe magnetic field) that is directed from a tapered portion of the main pole to the medium. Thus, the track density cannot be improved.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing a hard disk drive (HDD) according to a first embodiment;

FIG. 2 is an exemplary side view showing a magnetic head and suspension of the HDD;

FIG. 3 is an exemplary enlarged sectional view showing a head section of the magnetic head;

FIG. 9 is an exemplary plan view of the magnetic flux in the recording head taken from the ABS side of the slider;

FIG. 10 is an exemplary diagram comparatively showing off-track profiles of signal outputs (TAA) of recording patterns obtained when data is written to a magnetic disk by means of the recording head of the HDD of the first embodiment and the recording head of the comparative example;

FIG. 12 is an exemplary diagram obtained by plotting values of a wide-area field, which are calculated based on a recording field distribution with width CW of a leading core of the recording head along the track width and saturated magnetic flux density Bs2 of the leading core varied, for the value of CW;

FIG. 13 is an exemplary diagram obtained by plotting the values of the wide-area field, which are calculated based on the recording field distribution with width CW of the leading core of the recording head along the track width and saturated magnetic flux density Bs2 of the leading core varied, for the value of Bs2;

FIG. 15 is an exemplary perspective view schematically showing a recording head of an HDD according to the second embodiment;

FIG. 16 is an exemplary plan view of the recording head of a magnetic head according to the second embodiment taken from the ABS side; and FIG. 17 is an exemplary plan view of a recording head section according to a modification taken from the ABS side of a slider.

DETAILED DESCRIPTION

Figure 4:
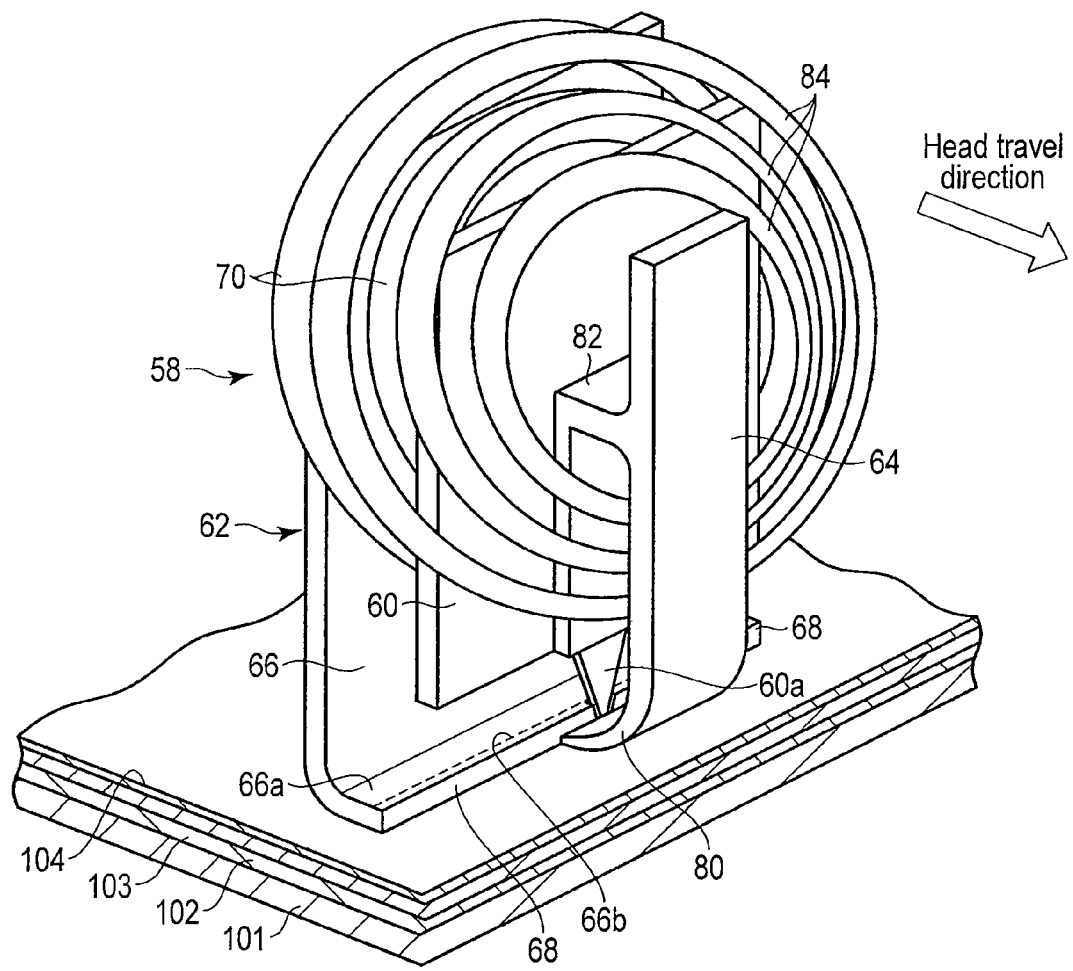
FIG. 4 is an exemplary perspective view schematically showing a recording head of the magnetic head.

Various embodiments will be described hereinafter with reference to the accompanying drawings.

In general, according to one embodiment, a recording head comprises a main pole configured to apply a recording magnetic field to a recording layer of a recording medium; a trailing core comprising a return pole opposed to a trailing side of the main pole with a write gap therebetween, and side shields arranged individually on opposite sides of the main pole transversely relative to tracks and magnetically separated from the main pole at a distance not more than double a track pitch of the recording medium; a first coil wound around the trailing core; a leading core comprising a junction opposed to a leading side of the main pole with a gap therebetween and joined to the side shields with a width of 20 μm or less transversely relative to the tracks and a connecting portion joined to the main pole in a position off the recording medium; and a second coil wound around the leading core.

First Embodiment

FIG. 1 shows the internal structure of an HDD according to a first embodiment with its top cover removed, and FIG. 2 shows a flying magnetic head. As shown in FIG. 1, the HDD comprises a housing 10, which comprises a base 10a in the form of an open-topped rectangular box and a top cover (not shown) in the form of a rectangular plate. The top cover is attached to the base by screws such that it closes the top opening of the base. Thus, the housing 10 is kept airtight inside and can communicate with the outside through a breather filter 26 only.

The base 10a carries thereon a magnetic disk 12, for use as a recording medium, and a mechanical unit. The mechanical unit comprises a spindle motor 13, a plurality (e.g., two) of magnetic heads 33, head actuator 14, and voice coil motor (VCM) 16. The spindle motor 13 supports and rotates the magnetic disk 12. The magnetic heads 33 record data on and reproduce data from the disk 12. The head actuator 14 supports the heads 33 for movement relative to the disk 12. The VCM 16 pivots and positions the head actuator. The base 10a further carries a ramp loading mechanism 18, latch mechanism 20, and board unit 17. The ramp loading mechanism 18 holds the magnetic heads 33 in positions off the magnetic disk 12 when the heads are moved to the outermost periphery of the disk. The latch mechanism 20 holds the head actuator 14 in a retracted position if the HDD is jolted, for example. Electronic components, such as a preamplifier, head IC, etc., are mounted on the board unit 17.

A printed circuit board 25 is attached to the outer surface of the base 10a by screws such that it faces the bottom wall of the base. The circuit board 25 controls the operations of the spindle motor 13, VCM 16, and magnetic heads 33 through the board unit 17.

As shown in FIG. 1, the magnetic disk 12 is coaxially mounted on the hub of the spindle motor 13 and clamped and secured to the hub by a clamp spring 15, which is attached to the upper end of the hub by screws. The disk 12 is rotated at a predetermined speed in the direction of arrow B by the spindle motor 13.

The head actuator 14 comprises a bearing 21 secured to the bottom wall of the base 10a and a plurality of arms 27 extending from the bearing. The arms 27 are arranged parallel to the surfaces of the magnetic disk 12 and at predetermined intervals and extend in the same direction from the bearing 21. The head actuator 14 comprises elastically deformable suspensions 30 each in the form of an elongated plate. Each suspension 30 is formed of a plate spring, the proximal end of which is secured to the distal end of its corresponding arm 27 by spot welding or adhesive bonding and which extends from the arm. Each suspension 30 may be formed integrally with its corresponding arm 27. The magnetic heads 33 are supported individually on the respective extended ends of the suspensions 30. Each arm 27 and its corresponding suspension 30 constitute a head suspension, and the head suspension and each magnetic head 33 constitute a head suspension assembly.

As shown in FIG. 2, each magnetic head 33 comprises a substantially cuboid slider 42 and read/write head section 44 on an outflow end (trailing end) of the slider. Each head 33 is secured to a gimbal spring 41 on the distal end portion of each corresponding suspension 30. A head load L directed to the surface of the magnetic disk 12 is applied to each head 33 by the elasticity of the suspension 30. The two arms 27 are arranged parallel to and spaced apart from each other, and the suspensions 30 and heads 33 mounted on these arms face one another with the magnetic disk 12 between them.

Each magnetic head 33 is electrically connected to a main flexible printed circuit board (main FPC, described later) 38 through the suspension 30 and a relay FPC 35 on the arm 27.

As shown in FIG. 1, the board unit 17 comprises an FPC main body 36 formed of a flexible printed circuit board and the main FPC 38 extending from the FPC main body. The FPC main body 36 is secured to the bottom surface of the base 10a. The electronic components, including a preamplifier 37 and head IC, are mounted on the FPC main body 36. An extended end of the main FPC 38 is connected to the head actuator 14 and also connected to each magnetic head 33 through each relay FPC 35.

The VCM 16 comprises a support frame (not shown) extending from the bearing 21 in the direction opposite to the arms 27 and a voice coil supported on the support frame. When the head actuator 14 is assembled to the base 10a, the voice coil is located between a pair of yokes 34 that are secured to the base 10a. Thus, the voice coil, along with the yokes and a magnet secured to one of the yokes, constitutes the VCM 16.

If the voice coil of the VCM 16 is energized with the magnetic disk 12 rotating, the head actuator 14 pivots, whereupon each magnetic head 33 is moved to and positioned on a desired track of the magnetic disk 12. As this is done, the head 33 is moved radially relative to the disk 12 between the inner and outer peripheral edges of the disk.

The following is a detailed description of configurations of the magnetic disk 12 and each magnetic head 33. FIG. 3 is an enlarged sectional view showing the disk and the head section 44 of the head 33.

As shown in FIGS. 1 to 3, the magnetic disk 12 comprises a substrate 101 formed of a nonmagnetic disk with a diameter of, for example, about 2.5 inches. A soft magnetic layer 102 for use as an underlayer is formed on each surface of the substrate 101. The soft magnetic layer 102 is overlain by a magnetic recording layer 103 having a magnetic anisotropy perpendicular to the disk surface. Further, a protective layer 104 is laminated to the recording layer 103.

As shown in FIGS. 2 and 3, each magnetic head 33 is formed as a flying head, and comprises the substantially cuboid slider 42 and the head section 44 formed on the outflow or trailing end of the slider. The slider 42 is formed of, for example, a sintered body (AlTic) containing alumina and titanium carbide, and the head section 44 is a thin film.

The slider 42 has a rectangular disk-facing surface or airbearing surface (ABS) 43 configured to face a surface of the magnetic disk 12. The slider 42 is caused to fly by the airflow C produced between the disk surface and ABS 43 as the magnetic disk 12 rotates. The direction of the airflow C is coincident with the direction of rotation B of the disk 12. The slider 42 is located on the surface of the disk 12 in such a manner that the longitudinal direction of the ABS 43 is substantially coincident with the direction of the airflow C.

The slider 42 comprises leading and trailing ends 42a and 42b on the inflow and outflow sides, respectively, of the airflow C. The ABS 43 of the slider 42 is formed with leading and trailing steps, side steps, negative-pressure cavity, etc., which are not shown.

As shown in FIG. 3, the head section 44 is formed as a dual-element magnetic head, comprising a reproduction head 54 and recording head 58 formed on the trailing end 42b of the slider 42 by thin-film processing.

The reproduction head 54 comprises a magnetic film 55 having a magnetoresistive effect and shield films 56 and 57 located on the trailing and leading sides, respectively, of the magnetic film 55 so that they sandwich the magnetic film between them. The respective lower ends of the magnetic film 55 and shield films 56 and 57 are exposed in the ABS 43 of the slider 42.

The recording head 58 is located nearer to the trailing end 42b of the slider 42 than the reproduction head 54. FIG. 4 is a perspective view schematically showing the recording head 58 and magnetic disk 12, and FIG. 5 is a plan view of a recording head portion taken from the side of the ABS 43 of the slider 42.

Figure 5:
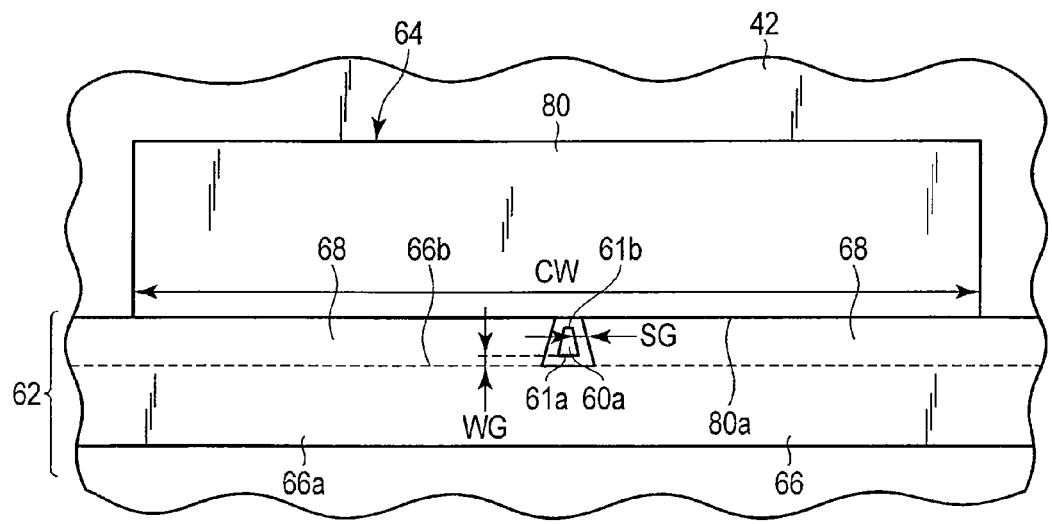
FIG. 5 is an exemplary plan view of the recording head section taken from the side of an ABS of a slider.

As shown in FIGS. 3 to 5, the recording head 58 comprises a main pole 60 and trailing and leading cores 62 and 64. The main pole 60 is formed mainly of a high-permeability material and produces a recording magnetic field perpendicular to the surfaces of the magnetic disk 12.

The main pole 60 extends substantially at right angles to the surfaces of the magnetic disk 12. A distal end portion 60a of the main pole 60 on the side of the magnetic disk 12 is tapered toward the disk surface. The distal end portion 60a of the main pole 60 is formed with, for example, a trapezoidal cross-section and comprises trailing and leading end surfaces 61a and 61b. The trailing end surface 61a has a predetermined width and is located on the trailing end side. The leading end surface 61b, which is narrower than the trailing end surface, is opposed to it. The distal end surface of the main pole 60 is exposed in the ABS 43 of the slider 42. The width of the trailing end surface 61a is substantially equal to the track width of the magnetic disk 12.

The trailing core 62 comprises a return pole or write/shield pole 66, junction 67, and a pair of side shields 68. The return pole 66 is located on the trailing side of the main pole 60 and serves to efficiently close a magnetic path through the soft magnetic layer 102 just below the main pole. The junction 67 connects respective upper parts of the main and return poles 60 and 66. The side shields 68 are arranged individually on the opposite sides of the main pole 60 transversely relative to the tracks so that they are magnetically separated from the main pole 60 and formed integrally on the lower end portion of the return pole 66.

The return pole 66 is substantially L-shaped and its distal end portion 66a has an elongated rectangular shape. The distal end surface of the return pole 66 is exposed in the ABS 43 of the slider 42. A leading end surface 66b of the distal end portion 66a extends transversely relative to the tracks of the magnetic disk 12. The leading end surface 66b is opposed parallel to the trailing end surface 61a of the main pole 60 with write gap WG therebetween.

The side shields 68 are arranged individually on the opposite sides of the main pole 60 longitudinally relative to the write gap WG or transversely relative to the track. On the ABS 43, the side shields 68 are magnetically separated from the main pole 60. In the present embodiment, each side shield 68 is formed mainly of a high-permeability material such that it is integral with the distal end portion 66a of the return pole 66 and protrudes from the leading end surface 66b of the distal end portion 66a toward the leading end of the slider 42. Each side shield 68 extends from the leading end surface 66b of the return pole 66 to a position beyond the leading end surface 61b of the main pole 60.

As shown in FIG. 5, shortest distance SG between the side surface of the main pole 60 on the ABS along the track width and the side surface of its opposite side shield 68 is set to be not more than double the track pitch of the magnetic disk 12 that is settled within the HDD. Specifically, distance SG between the main pole 60 and each side shield 68 is set so that the maximum intensity of a return magnetic field just below the side shield 68, which returns through the soft magnetic layer 102 of the disk 12, is not more than the intensity of nucleation field Hn for magnetization reversal of the disk 12.

As shown in FIGS. 3 and 4, the recording head 58 comprises a recording coil (first coil) 70, which is wound around a magnetic path including the main and return poles 60 and 66 to pass magnetic flux to the main pole 60 while a signal is being written to the magnetic disk 12. For example, the recording coil 70 is wound around the junction 67 between the main and return poles 60 and 66.

As shown in FIGS. 3 to 5, the leading core 64 is located on the leading side of the main pole 60 so that it faces the main pole. The leading core 64 is substantially L-shaped and its distal end portion on the side of the magnetic disk 12 has an elongated rectangular shape and constitutes a junction 80. The distal or lower end surface of the junction 80 is exposed in the ABS 43 of the slider 42. A trailing end surface 80a of the junction 80 extends transversely relative to the tracks of the disk 12. The trailing end surface 80a is opposed parallel to the leading end surface 61b of the main pole 60 with a gap therebetween. Further, the trailing end surface 80a of the junction 80 is joined to the side shields 68 on the opposite sides of the main pole 60 transversely relative to the track. Width CW of that part of the junction 80 which is joined to the side shields 68 along the track width is adjusted to 20 μm or less.

The leading core 64 integrally comprises a connecting portion 82 joined to the main pole 60 in a position off the magnetic disk 12 and forms a magnetic circuit in conjunction with the main pole. The recording head 58 comprises a second coil 84, which is wound around a magnetic path including the main pole 60 and leading core 64 and applies a magnetic field to the magnetic circuit. For example, the second coil 84 is wound around the connecting portion 82 between the main pole 60 and leading core 64. The second coil 84 may be connected in series with the recording coil 70, or these coils may be separately subjected to current supply control. Currents to be supplied to the recording coil 70 and second coil 84 are controlled by a control section of the HDD.

In the recording head 58 described above, soft magnetic materials for the main pole 60, trailing core 62, and leading core 64 can be selected from alloys or compounds containing iron, cobalt, and/or nickel. The soft magnetic materials that form the trailing and leading cores 62 and 64 are selected so that there is a relation, $Bs2 > (Bs1 \times 0.5)$, between respective saturated magnetic flux densities Bs2 and Bs1 of the leading core 64 and return pole 66.

As shown in FIG. 3, a protective insulating film 81 entirely covers the reproduction and recording heads 54 and 58 except for those parts which are exposed in the ABS 43 of the slider 42. The protective insulating film 81 defines the contour of the head section 44.

Figure 6:
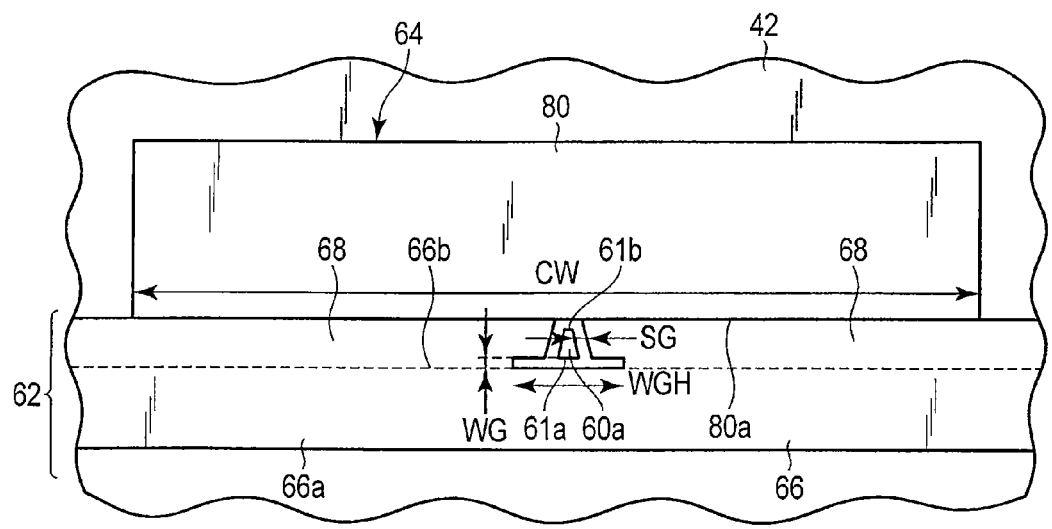
FIG. 6 is an exemplary plan view of a recording head section according to a modification taken from the ABS side of the slider.

As shown in FIG. 6, write gap WG magnetically separated between the main and return poles 60 and 66 may be designed so that length WGH along the track width is extended on the opposite sides transversely relative to the track. Thus, write gap WG may be designed to extend into the side shields 68.

When the VCM 16 is powered, according to the HDD constructed in this manner, the head actuator 14 pivots, whereupon each magnetic head 33 is moved to and positioned on the desired track of the magnetic disk 12. Further, the head 33 is caused to fly by the airflow C produced between the disk surface and the ABS 43 as the magnetic disk 12 rotates. When the HDD is operating, the ABS 43 of the slider 42 is opposed to the disk surface with a gap therebetween. As shown in FIG. 2, the magnetic head 33 is inclined so that the recording head 58 of the head section 44 is located closest to the surface of the disk 12 as the magnetic head flies. In this state, the reproduction head 54 reads recorded data from the disk 12, while the recording head 58 writes data to the disk.

In writing data, the main pole 60 is excited by the recording coil 70 so that a perpendicular recording magnetic field is applied from the main pole to the recording layer 103 of the disk 12 just below the main pole, whereby data is recorded with a desired track width. At the same time, a current is passed through the second coil 84 to excite the leading core 64, and a desired magnetic field is passed through a closed magnetic path including the side shields 68 and main pole 60.

Since the side shields 68 are arranged individually on the opposite sides of the main pole 60, magnetic flux leakage from the distal end portion 66a of the main pole 60 to adjacent tracks can be suppressed without reducing the quality of signals written to write tracks. Further, concentration of return magnetic fields on the side shields 68 can be prevented by passing a desired magnetic field through a second magnetic core 56b that forms a closed magnetic path including the side shields 68. Thus, as shown in FIG. 6, the magnetic field applied from the main pole 60 to the recording layer 103 is prevented from intensively returning toward the side shields 68 by a magnetic field that passes through the closed magnetic path including the side shields 68. After the applied magnetic field propagates in the surface direction through the soft magnetic layer, it gradually returns to the return pole.

In this way, degradation or erasure of recorded data in the positions of adjacent tracks off a write track can be suppressed. Thus, erasure of data on the adjacent tracks can be prevented while maintaining the recording capacity on the write track, and the track density of the recording layer of the magnetic disk 12 can be increased to improve the recording density of the HDD.

Figure 7:
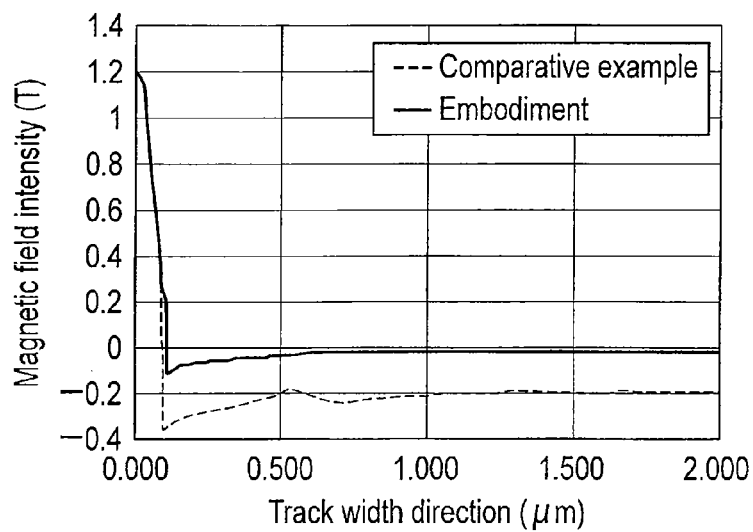
FIG. 7 is an exemplary diagram comparatively showing magnetic field intensities transversely relative to tracks for the recording head of the HDD according to the first embodiment and a recording head according to a comparative example.

FIG. 7 comparatively shows off-track profiles of recording field distributions obtained by means of the recording head 58 of the HDD of the present embodiment described above and a conventional recording head according to a comparative example, which comprises side shields but does not comprise a leading core and second coil, for example. In the recording head 58 of the present embodiment, the leading core 64 is formed mainly of a material with saturated magnetic flux density Bs2 of 1.0 T, and the return pole 66 of a material with Bs1 of 1.9 T. Distance SG between the main pole 60 and each side shield 68 is set to, for example, 6 μm.

In FIG. 7, the central position of the main pole 60 of the recording head transversely relative to the tracks is assumed to be 0 (μm). Broken and full lines represent one-side off-track profiles of the recording field distributions by means of the recording head of the comparative example and the recording head 58 of the present embodiment, respectively. According to the recording head 58 of the present embodiment, compared with that of the comparative example, as seen from FIG. 7, a magnetic field that erases or degrades recorded data in wide adjacent track regions covering tens of tracks on the magnetic disk is suppressed while maintaining the magnetic field intensity just below the main pole.

Figure 8:
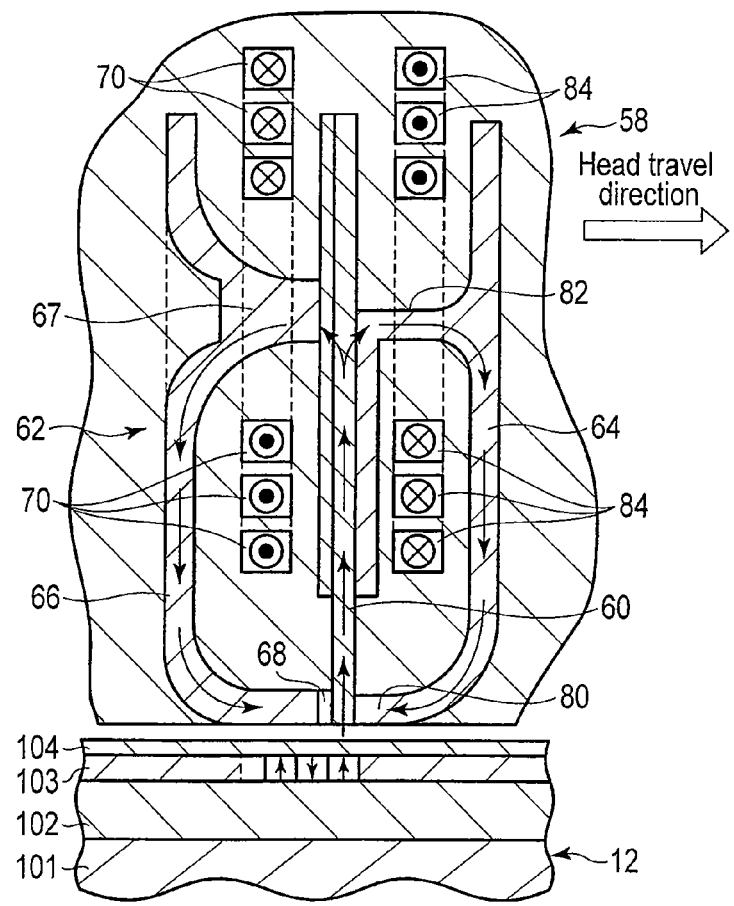
FIG. 8 is an exemplary sectional view schematically showing magnetic flux in the recording head.

FIGS. 8 and 9 individually show magnetic flux in the recording head 58 according to the present embodiment. Magnetic flux is directed in the directions of arrows in FIG. 8 as current is passed in the illustrated directions through the recording coil 70 and second coil 84. In FIG. 8, circles represent the direction toward this side of the drawing plane, and crosses represent the direction toward the other side. Thereupon, magnetic flux vectors that pass through the leading and trailing cores 64 and 62 are polarized in the same direction and repel each other. Thus, the magnetic flux perpendicular to the recording layer 103 of the magnetic disk 12, having so far been being concentrated just below the side shields 68, can be swirled away transversely relative to the tracks, as indicated by arrows in FIG. 9.

FIG. 10 shows results of adjacent write tests on the HDD. FIG. 10 illustrates off-track profiles of signal outputs (TAA) of recording patterns obtained when data is written to the magnetic disk by means of the recording heads according to the present embodiment and comparative example. The central position of the main pole of the recording head transversely relative to the tracks is assumed to be 0 (μm). A line plotted by hollow squares (□) represents an off-track profile of the signal output obtained when recording pattern 1 is reproduced while laterally offsetting the magnetic head along the track width after the recording pattern is written at a certain frequency in the track-width-direction position at 0 (μm) by the recording head of the comparative example. A line plotted by hollow circles (○) represents an off-track profile of the signal output (TAA) obtained when recording pattern 1 is reproduced while laterally offsetting the magnetic head again along the track width after a recording pattern is written at a frequency different from that of recording pattern 1 in the track-width-direction position at +0.15 (μm) by the recording head of the comparative example. The signal output for the line plotted by □ is degraded by the expanse of the return magnetic field just below the side shields.

A line plotted by solid squares (■) represents an off-track profile of the signal output obtained when recording pattern 1 is reproduced while laterally offsetting the magnetic head along the track width after the recording pattern is written at a certain frequency in the track-width-direction position at 0 (μm) by the recording head 58 of the present embodiment. A line plotted by solid circles (●) represents an off-track profile of the signal output (TAA) obtained when recording pattern 1 is reproduced while laterally offsetting the magnetic head again along the track width after a recording pattern is written at a frequency different from that of recording pattern 1 in the track-width-direction position at +0.15 (μm) by the recording head 58 of the present embodiment. Since the return magnetic field just below the side shields 68 is suppressed according to the present embodiment, the signal quality of recording pattern 1 is hardly degraded. Accordingly, the recording density can be increased by means of the recording head according to the present embodiment.

Thus, according to the recording head of the comparative example, the magnetic field just below the side shields 68 increases if magnetic flux from the main pole is concentrated on the side shields directly or through the soft magnetic layer 102 of the magnetic disk 12. In repeating recording operation on the same track, therefore, such a phenomenon occurs that recorded data is erased or degraded in wide regions covering tens of tracks from the center of the track concerned.

According to the recording head 58 of the present embodiment, in contrast, the maximum intensity of the return magnetic field just below the side shields 68, which returns through the soft magnetic layer 102 of the magnetic disk 12, can be made less than the intensity of nucleation field Hn for magnetization reversal, which is a magnetic characteristic of the recording layer 103 of the magnetic disk. Therefore, erasure or degradation of data recorded on adjacent tracks can be suppressed to enable high-density recording.

Figure 11:
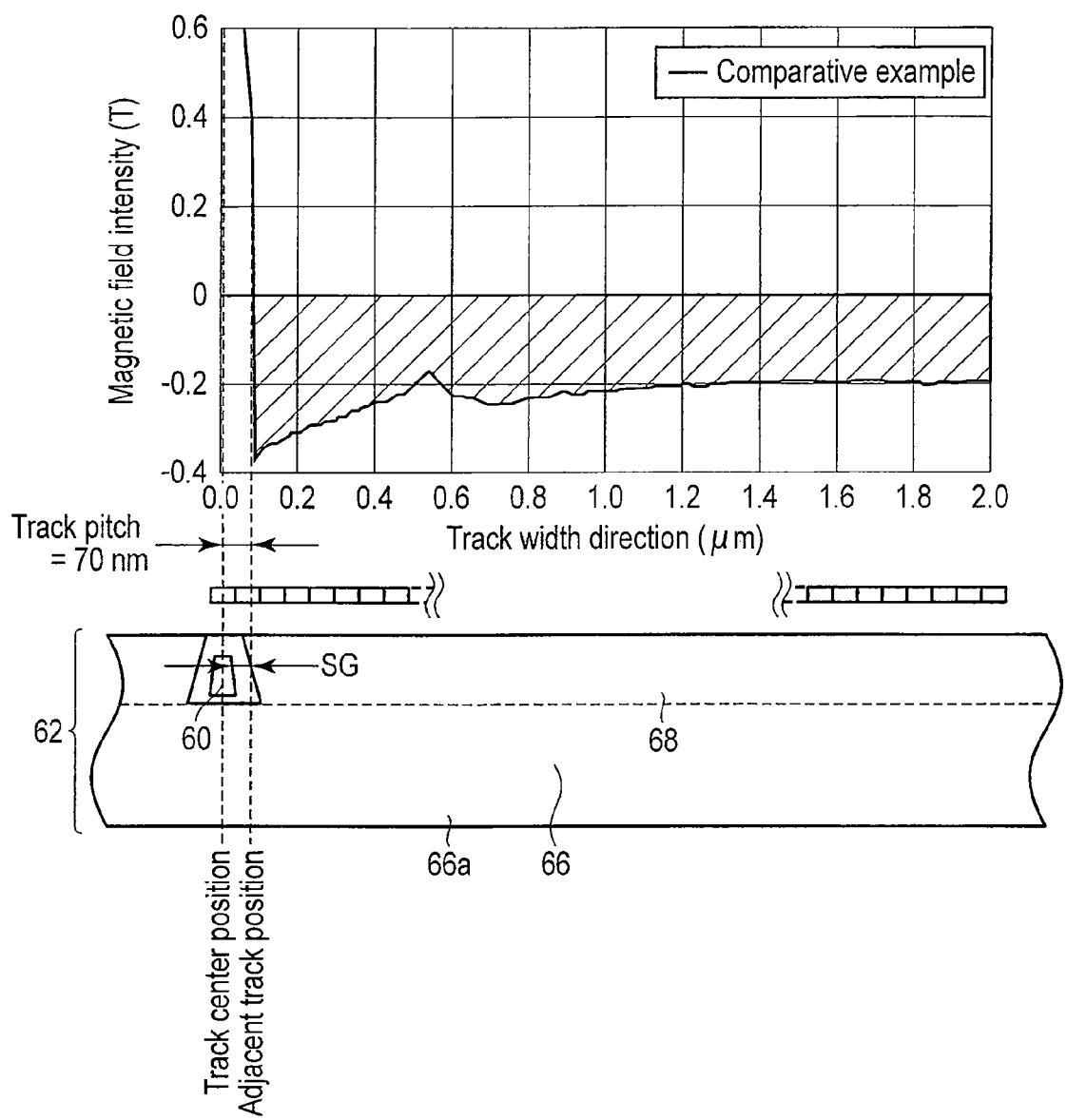
FIG. 11 is an exemplary diagram comparatively showing magnetic field intensities transversely relative to tracks for the recording heads of the embodiment and comparative example.

The following is a description of width CW of the junction between the trailing and leading cores 62 and 64. In the present embodiment, an average magnetic field is calculated as a wide-area field based on a hatched portion shown in FIG. 11, within a range of 2 μm at a distance corresponding to tens of tracks from the adjacent track position of 0.070 (μm) based on a recording track pitch of 0.070 (μm). The calculated average magnetic field is assumed to be an index of the magnetic field applied from the magnetic head, which influences tracks in a wide range. While the value of the wide-area field of the recording head of the comparative example is 0.23 (T), that of the recording head 58 of the present embodiment is 0.034 (T). Thus, this value for the present embodiment can be limited to about a seventh of the value for the comparative example.

FIGS. 12 and 13 show characteristics obtained by plotting values of the wide-area field, which are calculated based on a recording field distribution with width CW and saturated magnetic flux density Bs2 of the leading core 64 varied, in the recording head 58 of the present embodiment, for the values of CW and Bs2, respectively.

The characteristic curve of FIG. 12 is downwardly convex so that the wide-area field has a minimum value with width CW of 6 μm. This curve indicates such an effect that a magnetic field that erases or degrades recorded data in wide regions covering tens of tracks can be suppressed by joining the leading core 64 to the trailing core 62 within the range 0<CW<20 μm.

The following is a description of the respective saturated magnetic flux densities Bs1 and Bs2 of the return pole 66 and leading core 64. As shown in FIG. 13, the value of the wide-area field is suddenly reduced if the value of the saturated magnetic flux density Bs2 is changed from 0.5 to 1.0 (T). Thus, it is indicated that the reduction of the value of the wide-area field can be prevented to suppress the magnetic field that erases or degrades recorded data on adjacent tracks by using a material with Bs2>(Bs×0.5) for the leading core 64.

According to the present embodiment, as described above, there may be provided a recording head, configured so that degradation or erasure of data recorded on adjacent track regions can be prevented to enable high-density recording, and a disk drive provided with the same.

Second Embodiment

The following is a description of a magnetic head of an HDD according to a second embodiment.

The magnetic head of the HDD of the second embodiment differs from that of the first embodiment mainly in the configuration of the trailing core, and other configurations are the same as those of the magnetic head of the first embodiment. Therefore, like reference numbers are used to designate the same portions as those of the first embodiment, and a detailed description thereof is omitted.

Figure 14:
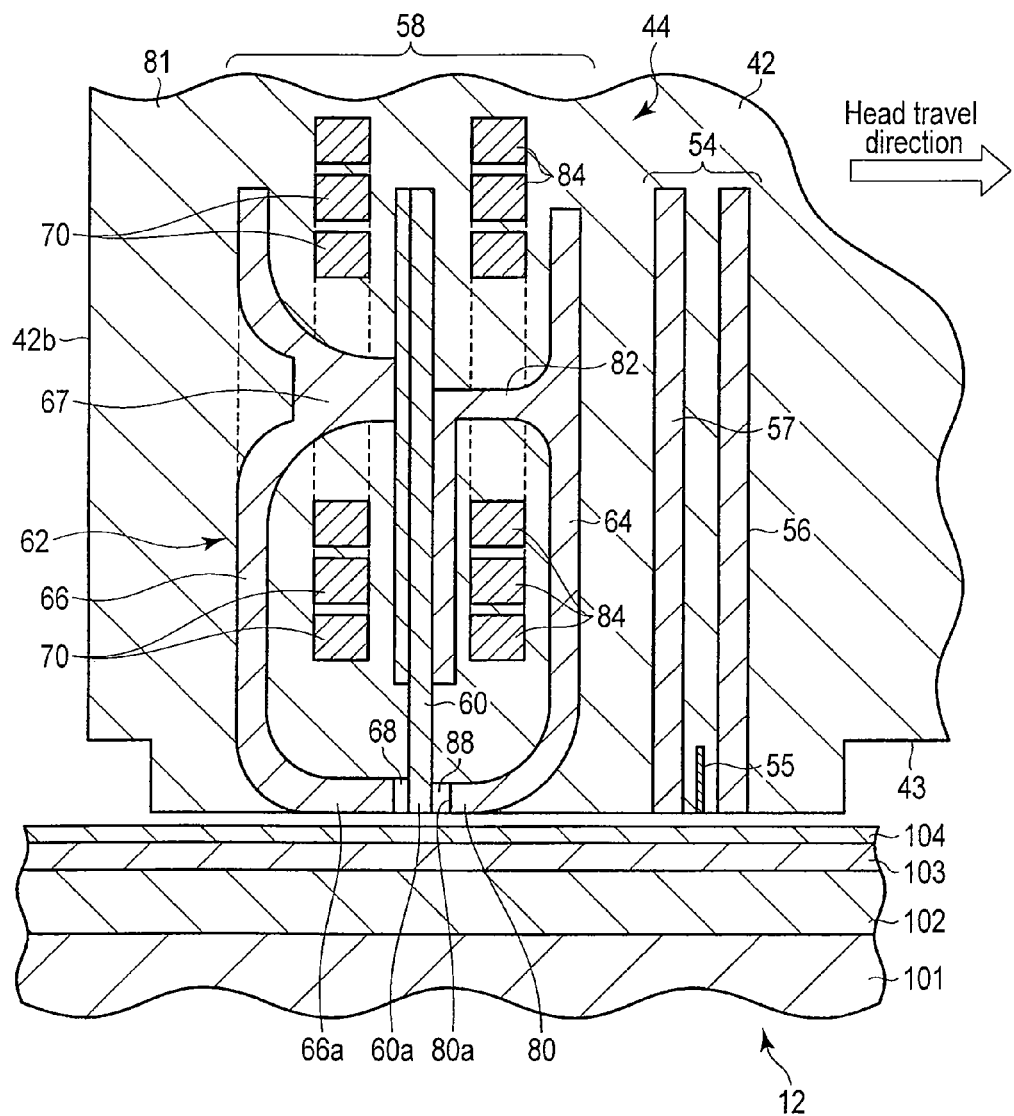
FIG. 14 is an exemplary enlarged sectional view showing a magnetic head according to a second embodiment.

FIG. 14 is an enlarged sectional view showing the magnetic disk and a head section 44 of a magnetic head 33, FIG. 15 is a perspective view schematically showing a recording head 58 and the magnetic disk 12, and FIG. 16 is a plan view of a recording head portion taken from the side of an ABS 43 of a slider 42.

According to the second embodiment, as shown in FIGS. 14 to 16, the recording head 58 comprises a main pole 60, trailing and leading cores 62 and 64, recording coil 70, and second coil 84. The main pole 60 is formed mainly of a high-permeability material and produces a recording magnetic field perpendicular to the surfaces of the magnetic disk 12. The coils 70 and 84 are wound around the trailing and leading cores 62 and 64, respectively.

The trailing core 62 integrally comprises a return pole or write/shield pole 66, junction 67, a pair of side shields 68, and leading shield 88. The return pole 66 is located on the trailing side of the main pole 60 and serves to efficiently close a magnetic path through a soft magnetic layer 102 just below the main pole. The junction 67 connects respective upper parts of the main and return poles 60 and 66. The side shields 68 are arranged individually on the opposite sides of the main pole 60 transversely relative to the tracks so that they are magnetically separated from the main pole 60 and formed integrally on the lower end portion of the return pole 66. The leading shield 88 is located on the leading side of the main pole 60 so that it is physically separated from the main pole on the ABS 43. The trailing core 62 is formed mainly of a high-permeability material.

The return pole 66 is substantially L-shaped and its distal end portion 66a has an elongated rectangular shape. The distal end surface of the return pole 66 is exposed in the ABS 43 of the slider 42. A leading end surface 66b of the distal end portion 66a extends transversely relative to the tracks of the magnetic disk 12. The leading end surface 66b is opposed parallel to the trailing end surface 61a of the main pole 60 with write gap WG therebetween.

The side shields 68 are arranged individually on the opposite sides of the main pole 60 longitudinally relative to the write gap WG or transversely relative to the track. On the ABS 43, the side shields 68 are magnetically separated from the main pole 60. In the present embodiment, each side shield 68 is formed mainly of a high-permeability material such that it is integral with the distal end portion 66a of the return pole 66 and protrudes from the leading end surface 66b of the distal end portion 66a toward the leading end of the slider 42. Each side shield 68 extends from the leading end surface 66b of the return pole 66 to a position beyond the leading end surface 61b of the main pole 60.

As shown in FIG. 16, distance SG between the main pole 60 and that end portion of each side shield 68 which faces the main pole is set to be not more than double the track pitch of the magnetic disk 12 that is settled within the HDD. Specifically, distance SG between the main pole 60 and each side shield 68 is set so that the maximum intensity of a return magnetic field just below the side shield 68, which returns through the soft magnetic layer 102 of the disk 12, is not more than the intensity of nucleation field Hn for magnetization reversal of the disk 12.

The leading shield 88 has an elongated rectangular shape extending transversely relative to the tracks and is opposed to the leading side of the main pole 60 with a gap therebetween and joined to the respective leading end surfaces of the side shields 68. The leading shield 88 is formed mainly of a high-permeability material such that it is integral with the side shields 68. Further, the leading shield 88 is thinner than the side shields 68 and flush with them on the ABS side.

The leading core 64 is located on the leading side of the main pole 60 so that it faces the main pole. The leading core 64 is substantially L-shaped and its distal end portion on the side of the magnetic disk 12 has an elongated rectangular shape and constitutes a junction 80. The distal or lower end surface of the junction 80 is exposed in the ABS 43 of the slider 42. The trailing end surface 80a of the junction 80 extends transversely relative to the tracks of the magnetic disk 12. The trailing end surface 80a is opposed parallel to the leading end surface 61b of the main pole 60 with a gap therebetween and joined to the leading end of the leading shield 88. Width CW of that part of the junction 80 which is joined to the leading shield 88 along the track width is adjusted to 20 μm or less. The leading core 64 integrally comprises a connecting portion 82 joined to the main pole 60 in a position off the magnetic disk 12 and forms a magnetic circuit in conjunction with the main pole.

In the recording head 58, soft magnetic materials for the main pole 60, trailing core 62, and leading core 64 can be selected from alloys or compounds containing iron, cobalt, and/or nickel. The soft magnetic materials that form the trailing and leading cores 62 and 64 are selected so that there is a relationship $Bs2>(Bs1\times0.5)$ between respective saturated magnetic flux densities Bs2 and Bs1 of the leading core 64 and return pole 66.

Other configurations of the HDD, as well as of the recording head 58 and magnetic head 33, are the same as those of the first embodiment.

According to the recording head 58 of the second embodiment constructed in this manner, the maximum intensity of the return magnetic field just below the side shields 68, which returns through the soft magnetic layer 102 of the magnetic disk 12, can be made less than the intensity of nucleation field Hn for magnetization reversal, which is a magnetic characteristic of the recording layer 103 of the magnetic disk. Therefore, erasure or degradation of data recorded on adjacent tracks can be suppressed to enable high-density recording. Thus, also in the second embodiment, there may be provided a recording head, configured so that degradation or erasure of data recorded on adjacent track regions can be prevented to enable high-density recording, and a disk drive provided with the same.

As shown in FIG. 17, write gap WG magnetically separated between the main and return poles 60 and 66 may be designed so that length WGH along the track width is extended on the opposite sides transversely relative to the track. Thus, write gap WG may be designed to extend into the side shields 68.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, the materials, shapes, sizes, etc., of the constituent elements of the head section may be changed if necessary. Further, the number of magnetic disks and heads used in the magnetic disk drive may be increased as required, and the size of each magnetic disk can be variously selected.

What is claimed is:

1. A recording head comprising:
a main pole configured to apply a recording magnetic field to a recording layer of a recording medium;
a trailing core comprising a return pole opposed to a trailing side of the main pole with a write gap therebetween, and side shields arranged individually on opposite sides of the main pole transversely relative to tracks and magnetically separated from the main pole at a distance not more than double a track pitch of the recording medium;
a first coil wound around the trailing core;
a leading core comprising a junction opposed to a leading side of the main pole with a gap therebetween and joined to the side shields with a width of 20 μm or less transversely relative to the tracks and a connecting portion joined to the main pole in a position off the recording medium; and
a second coil wound around the leading core.

2. The recording head of claim 1, wherein the leading core is formed mainly of a material having a saturated magnetic flux density Bs2 higher than half of a saturated magnetic flux density Bs1 of the return pole.

3. The recording head of claim 1, wherein the write gap extends into the side shields on either side of the main pole.

4. The recording head of claim 1, wherein the leading core comprises a leading shield located on the leading side of the main pole with a gap therebetween and joined to the pair of side shields, and the junction of the leading core is joined to the leading shield.

5. A recording head comprising:
a main pole configured to apply a recording magnetic field perpendicular to a recording layer of a recording medium;
a trailing core comprising a return pole opposed to a trailing side of the main pole with a write gap therebetween, and side shields arranged individually on opposite sides of the main pole transversely relative to tracks and magnetically separated from the main pole at a distance not more than double a track pitch of the recording medium;
a first coil wound around the trailing core;
a leading core comprising a junction opposed to a leading side of the main pole with a gap therebetween and joined to the side shields, and a connecting portion joined to the main pole in a position off the recording medium, the leading core being formed mainly of a material having a saturated magnetic flux density Bs2 higher than half of a saturated magnetic flux density Bs1 of the return pole; and
a second coil wound around the leading core.

6. A recording head comprising:
a main pole configured to apply a recording magnetic field to a recording layer of a recording medium;
a trailing core comprising a return pole opposed to a trailing side of the main pole with a write gap therebetween, and side shields arranged individually on opposite sides of the main pole transversely relative to tracks and magnetically separated from the main pole, wherein a distance between the main pole and each of the side shields is set so that the maximum intensity of a return magnetic field just below the side shield, which returns through the recording medium, is not more than an intensity of a nucleation field Hn for magnetization reversal of the recording medium;
a first coil wound around the trailing core;
a leading core comprising a junction opposed to a leading side of the main pole with a gap therebetween and joined to the side shields with a width of 20 μm or less transversely relative to the tracks and a connecting portion joined to the main pole in a position off the recording medium; and
a second coil wound around the leading core.

7. The recording head of claim 6, wherein the leading core is formed mainly of a material having a saturated magnetic flux density Bs2 higher than half of a saturated magnetic flux density Bs1 of the return pole.

8. The recording head of claim 6, wherein the write gap extends into the side shields on either side of the main pole.

9. The recording head of claim 6, wherein the leading core comprises a leading shield located on the leading side of the main pole with a gap therebetween and joined to the pair of side shields, and the junction of the leading core is joined to the leading shield.

10. A recording head comprising:
a main pole configured to apply a recording magnetic field perpendicular to a recording layer of a recording medium;
a trailing core comprising a return pole opposed to a trailing side of the main pole with a write gap therebetween, and side shields arranged individually on opposite sides of the main pole transversely relative to tracks and magnetically separated from the main pole, a distance between the main pole and each of the side shields being set so that the maximum intensity of a return magnetic field just below the side shield, which returns through the recording medium, is not more than a intensity of a nucleation field Hn for magnetization reversal of the recording medium;
a first coil wound around the trailing core;
a leading core comprising a junction opposed to a leading side of the main pole with a gap therebetween and joined to the side shields and a connecting portion joined to the main pole in a position off the recording medium, the leading core being formed mainly of a material having a saturated magnetic flux density Bs2 higher than half of a saturated magnetic flux density Bs1 of the return pole; and
a second coil wound around the leading core.

11. The recording head of claim 10, wherein the write gap extends into the side shields on either side of the main pole.

12. The recording head of claim 10, wherein the leading core comprises a leading shield located on the leading side of the main pole with a gap therebetween and joined to the pair of side shields, and the junction of the leading core is joined to the leading shield.

13. A disk drive comprising:
a recording medium comprising a soft magnetic underlayer and a recording layer having a magnetic anisotropy perpendicular to a surface of the medium;
a drive unit configured to rotate the recording medium; and
a magnetic head comprising a slider and the magnetic head of claim 1 provided on the slider and configured to perform data processing on the recording medium.

* * * * *